(12) United States Patent
Chupa et al.

(10) Patent No.: US 7,389,492 B2
(45) Date of Patent: Jun. 17, 2008

(54) FRAMEWORK FOR CODE GENERATORS

(75) Inventors: Kenneth A. Chupa, Guelph (CA);
Timothy M. Francis, Newmarket (CA);
Steven F. Wasleski, Cary, NC (US); L. Scott Rich, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 09/804,346

(22) Filed: Mar. 12, 2001

(65) Prior Publication Data
US 2004/0205696 A1    Oct. 14, 2004

(51) Int. Cl.
*G06F 9/44* (2006.01)
(52) U.S. Cl. .................................. 717/106; 717/120
(58) Field of Classification Search ............... 717/106, 717/120
See application file for complete search history.

(56) References Cited

U.S. PATENT DOCUMENTS

| | | | | |
|---|---|---|---|---|
| 5,313,635 A | * | 5/1994 | Ishizuka et al. | 717/173 |
| 5,754,858 A | * | 5/1998 | Broman et al. | 717/111 |
| 5,774,728 A | * | 6/1998 | Breslau et al. | 717/141 |
| 5,812,847 A | * | 9/1998 | Joshi et al. | 717/109 |
| 6,449,050 B1 | * | 9/2002 | Haikin | 358/1.1 |
| 6,496,833 B1 | * | 12/2002 | Goldberg et al. | 707/102 |
| 6,738,967 B1 | * | 5/2004 | Radigan | 717/146 |
| 6,742,175 B1 | * | 5/2004 | Brassard | 717/107 |
| 6,948,150 B1 | * | 9/2005 | Pepin | 717/107 |

* cited by examiner

*Primary Examiner*—Tuan Dam
*Assistant Examiner*—Michael Yigdall
(74) *Attorney, Agent, or Firm*—A. Bruce Clay; Hoffman, Warnick & D'Alessandro LLC

(57) ABSTRACT

Embodiments of the invention provide a dictionary, which may be modified by a developer, that provides a mapping of the generation routine to be performed and a pointer or identifier of the generator employed for the specified generation routine. As will be appreciated, embodiments of the invention may employ a dictionary which comprises a plurality of generation routine-code generator identity data pairs. A generator routine may be, for example, associated with the generation of source code associated with a particular object class, fields, methods, method bodies, procedures, comments, subroutines and the like. By modifying a generation routine-code generator identity data pair in a generator dictionary, a developer or user is able to modify the source code (e.g., the structure and/or content of the source) which is ultimately generated by the generator.

14 Claims, 7 Drawing Sheets

FRAMEWORK FOR CODE GENERATORS

FIELD OF THE INVENTION

The present invention relates to code generation and, more particularly, to a method and system of providing a framework for code generators.

BACKGROUND TO THE INVENTION

Computer applications continue to play an increasingly important role in the lives of individuals. Additionally, the desire by end-users for bigger, better and faster applications has also increased.

Unfortunately for application development teams, the applications have increased in complexity. As a result of this complexity, the time to develop applications has also increased. Unfortunately, the demand for bigger, better and faster applications is often manifested in demands that these new applications be provided to the market in ever shorter time frames.

As will be apparent, the market forces to develop bigger, better and faster applications in ever shorter times is in direct competition with the development teams' need for longer times to develop these same applications. Accordingly, tools to assist a developer or development teams in shortening the development cycle are desired.

One example of an application development tool is known in the art as computer code generators. These generators are used to generate source code which can then be compiled or interpreted as required by the operating environment.

As a result of the laborious nature of producing some code, code generators have been created. These code generators enable developers to spend more time on the operations which differentiate their applications from their competitors and less time writing code for common and relatively standard attributes/operations.

These automatic code generators, which often use a graphical or visual representation or model of the desired output, generate code based on the input data received (e.g., the model). For example, writing computer code for a graphical user interface (GUI) such as those common to most users of the Microsoft Windows operating system, is quite time consuming. To assist developers in generating the code for a GUI, automatic code generators have been created. These GUI code generators allow developers to work in a graphical development environment and select various user interface controls (e.g., radio buttons, drop down list boxes, selection boxes, etc.), typically using a "drag and drop" mechanism, and place the user interface controls in the graphical development environment representing a screen image to be presented to a user. When the developer has completed the graphical appearance, the developer instructs the development environment to generate the code which will implement the graphical representation created. The code generated may be in any language supported by the code generator (e.g., C, C++, Java™, etc.). As will be appreciated by those of ordinary skill in the art, the code actually generated include several files with each file having one or more sub-components. In structured languages, these sub-components may be reflected as functions, procedures, subroutines and the like. In object oriented languages these sub-components may include object classes, objects, fields, methods, method bodies and the like.

A further example of code generators are those used with Enterprise JavaBeans™ ("EJB"). EJBs are objects which, generally, describe some business logic. An automatic code generator, applied to the EJB generates source code objects for the particular environment for which the source code is being deployed. A single EJB input into a code generator may result in several object classes being generated (depending, for example, on the deployment environment and the bean type) with each object class describing one or more objects and each object including various fields, methods and method bodies.

Presently, code generators are provided to developers as a single application which generate code for each of the sub-components required based on the input provided. However, as can be appreciated, a single code generator often does not provide optimal code for each sub-component. Also, developers often find that a single generator generates certain blocks of code which is not appropriate for the environment in which the application (comprising the source code generated) is to be deployed. The blocks of code that are of relevance to the developer (i.e., those blocks of code which are inappropriate or unsatisfactory) are often generated by identifiable portions in the source code of the generator itself. Unfortunately, for the developer to identify these portions in the source code requires that the source to the code generator be provided to the developer. The provider of the code generator is often unwilling to provide the source code for a variety of reasons. This is an unsatisfactory situation from the developer's point of view.

Furthermore, existing code generators do not easily provide developers the ability to extend or modify the capabilities of the code generator unless the source code itself is extended or modified. As before, this is an unsatisfactory situation.

Accordingly, a code generator framework which addresses some of the difficulties in application development is desired.

SUMMARY OF THE INVENTION

Embodiments of the invention provide a dictionary, which may be modified by a developer, that provides a mapping of the generation routine to be performed and a pointer or identifier of the generator employed for the specified generation routine. As will be appreciated, embodiments of the invention may employ a dictionary which comprises a plurality of generation routine-code generator identity data pairs.

A generator routine may be, for example, associated with the generation of source code associated with a particular object class, fields, methods, method bodies, procedures, comments, subroutines and the like.

By modifying a generation routine-code generator identity data pair in a generator dictionary, a developer or user is able to modify the source code (e.g., the structure and/or content of the source) which is ultimately generated by the generator.

Advantageously, embodiments of the invention do not impose on developers a single code generator. Rather, embodiments of the invention enable multiple generators (from, perhaps, multiple code generator vendors) to be selected by the developer to suit the developers' needs. Additionally, a developer, requiring code generation for multiple deployment environments, may generate code from specified input data employing an instance of the generator dictionary for a first deployment environment, and then, for a second deployment environment, and using the same input data, employ a different instance of the generator dictionary. This may result in source being better suited to the respective deployment environments. Instances of the generator dictionary may be created by simple modification of a generator dictionary.

Advantageously, embodiments of the invention enable code generator providers the opportunity to provide a code generator optimized for particular code generation routines to be "plugged" into a framework provided by the generator dictionary. This enables developers to select the best generators for the source code which requires generation (cf. using one code generator for all code generation routines).

In a further advantage, embodiments of the invention enable developers to easily modify or extend the capabilities of the code generation tool. This extension or modification may be enabled by specifying a new code generation routine and/or data identifying or pointing to a new code generator in the generator dictionary.

In a further advantage, embodiments of the invention are more adaptable to changing deployment environments. Presently, if the deployment environment changes, a new code generator often must be used to address these changes. Embodiments of the present invention enable developers to replace individual generators (i.e., generator routines) instead of replacing, in entirety, the code generator. Remaining code generators may be reused.

In a further, embodiments of the invention enable developers to modify only the generation routine-code generator identity data pair(s) which are impacted by the environment changes in contrast to present development environments which require a complete replacement of the entire code generator or modification of the source code for a code generator to effect modifications.

A further advantage of embodiments of the present invention is the ability to facilitate customization of generated code through the replacement of code generators in the generator dictionary associated with particular generation routines.

In yet a further advantage, embodiments of the present invention facilitate a logical generator (that is, a generation routine) to delegate or call other generators for the generation of the source code. This advantage is particularly suited to environments which result in hierarchically organized source code (such as, for example, object oriented source code).

Other advantages of embodiments of the invention will be apparent and appreciated by those of ordinary skill in the art.

In one aspect of the invention there is provided a computer system for generating source code, said computer system comprising: a generator dictionary associating a generator routine with a generator identity, said generator identity identifying a code generator; and a code generation framework tool wherein said code generation framework tool, responsive to a request for an invocation of said generator routine, invokes said code generator identified by said generator identity associated with said generator routine.

In a further aspect of the invention there is provided a method for generating source code from input data, said method comprising: responsive to a request for invoking a generator routine, identifying a code generator associated with said generator routine; passing said input data to said code generator identified, said code generator generating source code.

In a further aspect of the invention there is provided a method of generating source code for a first and a second deployment environment from a single input, said method comprising: invoking a first code generator to generate source code for said first deployment environment from said single input, said first code generator identified by retrieving code generator identity data from a generator dictionary based on a generator routine; modifying said generator dictionary to associate a second code generator with said generator routine; and invoking said second code generator to generate source code for said second deployment environment from said single input, said second code generator identified by retrieving code generator identity data from said generator dictionary based on said generator routine.

In a further aspect of the invention there is provided a generator dictionary comprising: a plurality of generator routines, each of said generator routines association with code generator identity data.

In a further aspect of the invention there is provided a code generation framework tool comprising: a receiver for receiving input data; a generator dictionary accessor for retrieving data from a generator dictionary; and an invoking mechanism for calling a code generator; and wherein, responsive to a receipt of input data at said receiving, said invoking mechanism calls a code generator identified by identity data retrieved by said generator dictionary accessor from a generator dictionary.

In a further aspect of the invention there is provided a computer readable medium storing instructions and data, said instructions and data for adapting a computer system to: responsive to a request for invoking a generator routine, identify a code generator associated with said generator routine; pass said input data to said code generator identified, said code generator generating source code.

DETAILED DESCRIPTION OF EMBODIMENTS OF THE INVENTION

Throughout much of the remainder of the specification the exemplary embodiment discussed involves the input of an Enterprise JavaBean™ ("EJB") into a code generating framework embodying aspects of the invention. As persons of ordinary skill in the art will appreciate, an EJB may result in the generation of source code for several object classes depending upon the characteristics of the EJB and the environment in which the source code to be generated is deployed. For example, an EJB may be a session bean or an entity bean. Moreover, an entity bean may manage its own persistence (i.e., bean managed persistence (BMP)) or require a container to manage its persistence (i.e., container managed persistence (CMP)). These exemplary characteristics partially determine the number and structure of source code object classes that require creation. Each source object class created may include various fields and methods. Each method includes a method body which defines the operations performed by the method when invoked. As is known by those skilled in the art, EJBs result in source code in the Java™ programming language which is an object-oriented language. However, as will apparent to those of ordinary skill in the art, the embodiments described hereafter are also applicable to other object oriented languages (e.g., C++, SmallTalk™, etc.) and other types of programming languages (e.g., structured languages (like C, Fortran, etc.) and the like).

The invention is particularly adapted to the object oriented interpreted languages (e.g., Java) for a code generation framework tool and the code generators since these language facilitate the dynamic loading of source code generators at run time.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100. For example, the generator dictionary 310 described below (with reference to FIG. 3 and Table 1) could, for example, include generator identity data which identifies or points to code generators 312 which are invoked across a network.

Figure 1:
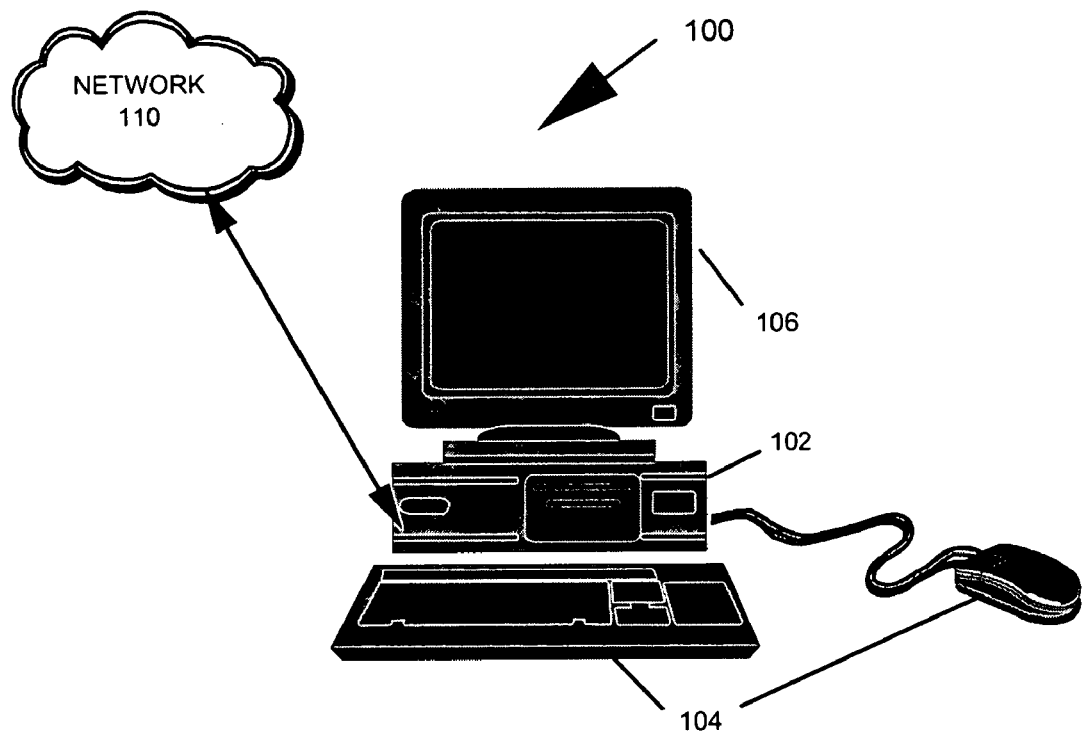
FIG. 1 schematically illustrates a computer system embodying aspects of the invention.

Now, referencing FIG. 1, an embodiment of the invention, computer system 100, is illustrated. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like.

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
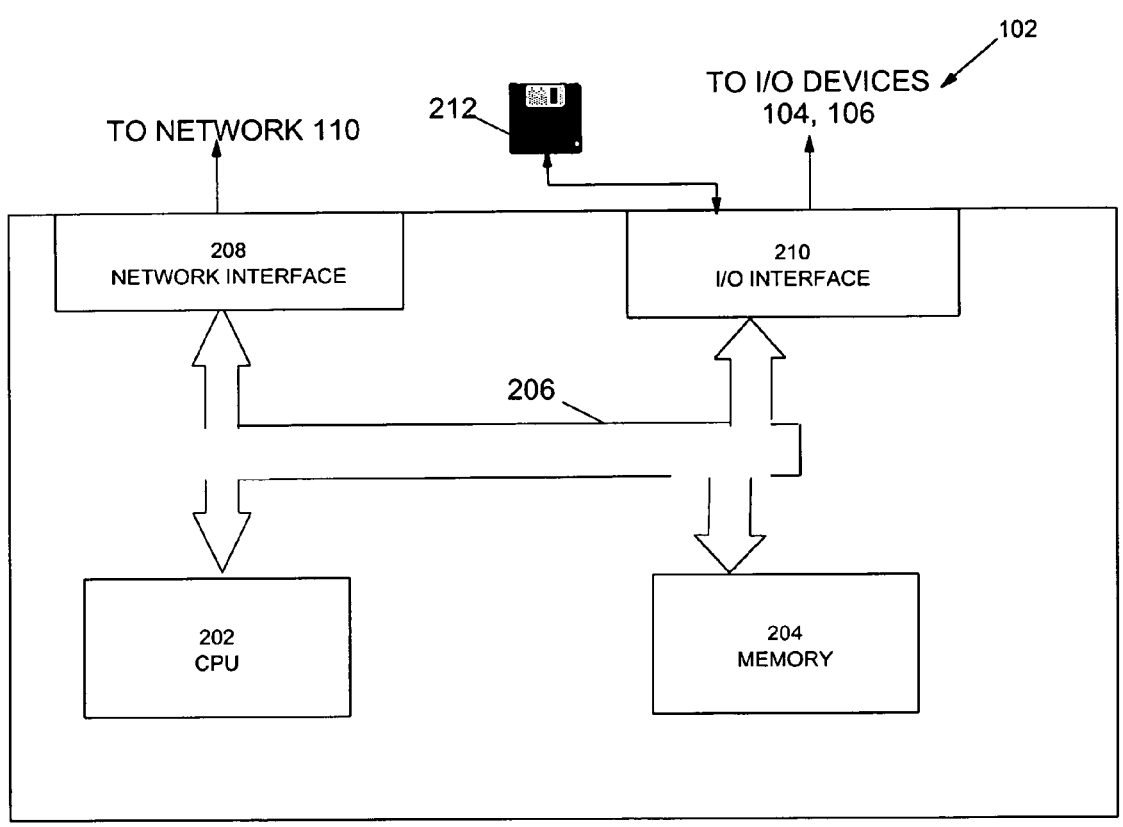
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. For example, if code generators 312 (described below) are independent of one another, then a plurality of such code generators could be executed in parallel on distributed across multiple processors. CPU 202 may also include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 110. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3A:
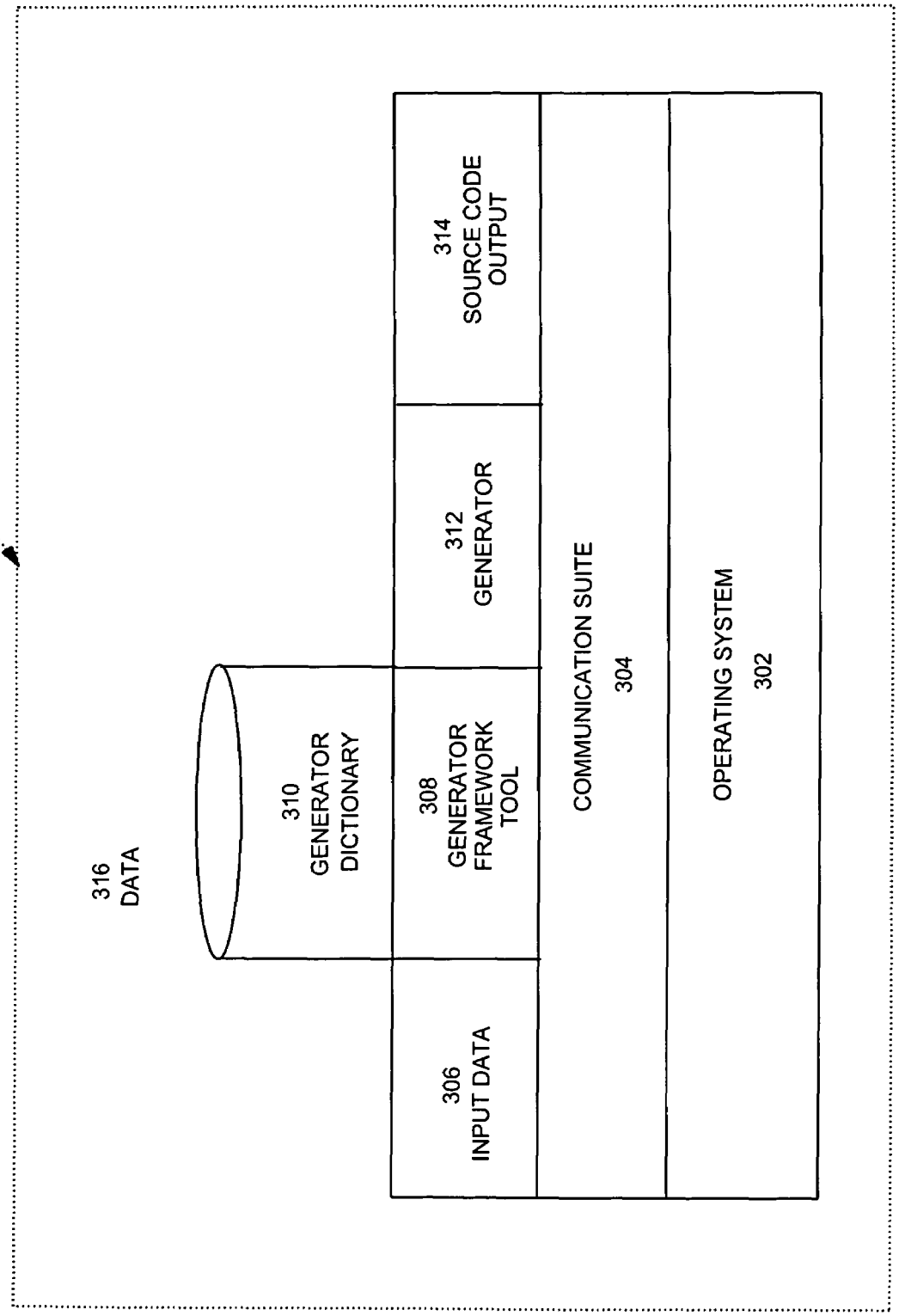
FIG. 3A illustrates, in functional block form, a portion of FIG. 2.

The computer instructions/applications stored in memory 204 and executed by CPU 202 (thus adapting the operation of computer system 100 as described herein) are illustrated in functional block form in FIG. 3A. As will be appreciated by those of ordinary skill in the art, the delineation between aspects of the applications illustrated as functional blocks in FIG. 3A is somewhat arbitrary as the various operations attributed to a particular application as described herein may, in alternative embodiments, be subsumed by another application.

As illustrated, for exemplary purposes only, memory 204 stores operating system (OS) 302, communications suite 304, source model 306, target model 308, model mapper 310, mapping lookup table 312 and model action operator 314.

OS 302 is an operating system suitable for operation with a selected CPU 202 and the operations described herein. Multitasking, multithreaded OSes such as, for example, IBM AIX™, Microsoft Windows N™, Linux or the like, are expected in many embodiments to be preferred.

Communication suite 304 provides, through, interaction with OS 302 and network I/F 208 (FIG. 2), suitable communication protocols to enable communication with other networked computing devices via network 110 (FIG. 1). Communication suite 304 may include one or more of such protocols such as TCP/IP, ethernet, token ring and the like.

The data to be input to generator framework tool 308 is identified as input data 306. As will be appreciated by those of ordinary skill in the art, the format of input data 306 will be dependent upon numerous factors including, for example, the source code language to be generated, the deployment environment, the tool used to generate the input data as well as many others. In the exemplary embodiment, input data 306 is an EJB. However, other types of input data such as a graphical or textual description could equally be employed. For example, a file describing a GUI screen image could be used as input data 306.

Generator framework tool 308 operates to: receive input data 306; access and retrieve data from generator dictionary 310; and call or launch the operations of code generators 312. The function and operations of generator framework tool 308 is described in greater detail below with reference to FIG. 4. Generator framework tool 308 provides a receiver for receiving input data 306; a generator dictionary access function for accessing and retrieving data from generator dictionary 310 and an invoking mechanism for calling or launching a code generator 312. It may be desirable in other embodiments of the invention for generator framework tool 308 to provide additional functionality. For example, generator framework tool 308 may provide services and infrastructure that could be used by code generators 312.

Generator dictionary 310 stores data which associates a generator routine with data identifying the generator which is tasked with generating source code for that routine. Generator dictionary 310 may be in the form of a lookup table or database. The data describing generator dictionary 310 may be in binary or user readable text form (e.g., a word processing document or text file, respectively). It is preferred that generator dictionary 310 be readily accessible to facilitate the modification/insertion of generator routine-generator identity data pairs.

In the exemplary embodiment, generator dictionary 310 is a simple editable ASCII text file (editable by numerous text file editors known in the art). An ASCII text file provides a readily accessible format for the modification/insertion of generator routine-generator identity data pairs. In the exemplary embodiment each generator routine-generator identity data pair forms a single line and is tabbed delimited. An excerpt from the exemplary generator dictionary 310 for an EJB as input data 306 is illustrated below in Table 1.

TABLE 1

Excerpt from an exemplary generator dictionary 310

| Generator Routine | Generator Identity Data |
| --- | --- |
| SessionBeanDeploy | com.xxx.generators.SessionBeanDeploy |
| BMPEntityDeploy | com.xxx.generators.BMPBeanDeploy |
| CMPEntityDeploy | com.xxx.generators.CMPBeanDeploy |
| SessionHome | com.xxx.generators.SessionHome |
| BMPEntityHome | com.xxx.generators.BMPEntityHome |
| CMPEntityHome | com.xxx.generators.CMPEntityHome |
| RemoteHome | com.xxx.generators.RemoteHome |
| RemoteSession | com.xxx.generators.RemoteImpl |
| RemoteBMPEntity | com.xxx.generators.RemoteImpl |
| RemoteCMPEntity | com.xxx.generators.RemoteImpl |
| FinderIntf | com.xxx.generators.FinderIntf |
| Persister | com.xxx.generators.Persister |
| SessionHomeClass | com.xxx.generators.SessionHomeClass |
| BMPEntityHomeClass | com.xxx.generators.BMPEntityHomeClass |
| CMPEntityHomeClass | com.xxx.generators.CMPEntityHomeClass |
| RemoteHomeClass | com.xxx.generators.RemoteHomeClass |

A generator routine is a symbolic name by which code (e.g., other code generators) will reference or identify a code generator 312. The generator routine "name" (or data identifying the generator routine) is preferably one which suggests the operations performed by the associated code generator (identified by the generator identity data). This naming of the generator routines may accomplished by identifying the entity (whether logical or physical) that this generated in the actual source code generated. For example, a generator routine may be associated with producing the deployed code for an entity bean that manages its own persistence. Accordingly, a generator routine named BMPEntityDeploy may be a satisfactory name as it conveys this meaning. As will be appreciated the naming convention for the generator routine may be defined in other and various manners.

A logical generator is a code generator which does not directly generate any source code but operates to call other code generators to do so. These other code generators may themselves be logical code generators (which, in turn would operate to call additional code generators) or physical code generators. A physical code generator is a code generator that actually generates source code. For example, and referencing Table 1, BMPEntityDeploy is a logical code generator which calls other code generators including BMPEntityHomeClass. BMPEntityHomeClass is a physical code generator that actually generates source code.

Generator identity data is data which is used to locate or find the executable code to perform the desired code generation.

Further explanation for some of the entries in Table 1 is provided below with reference to operations 400 illustrated in flowchart form in FIG. 4.

Code generators 312 are similar to source code generators presently available to the development community. However, unlike present source code generators, code generators 312 are preferably adapted to perform fewer code generation tasks than the conventional "one-size fits all" code generators (i.e., a single code generator generating all the code for all deployment environments). In the exemplary, implementations (e.g., home implementations, remote implementations, persistence implementations, etc.) object classes, objects, fields, methods and method bodies may be generated by different code generators 312. The level of granularity (i.e., how focussed the operations of a selected code generator 312, as measured by the number of tasks or sub-components for which source code is generated) may differ between embodiments of the invention.

In the exemplary embodiment, individual code generators 312 have minimal functionality and produce only code for the target environment. In this embodiment, generator framework tool 308 provides the additional functionality necessary to enable individual code generators 312 to provide the minimal functionality described above. For example, generator framework tool 308 may provide a service to format the output from individual code generators 312. This may include, for example, string handling services that are tailored to source code generation such as providing support for indenting generated source code to improve readability. Additionally, or in alternative embodiments, generator framework tool 312 may provide the necessary services for storing the generated code (e.g., organizing source code generated into files, saving the source code into a database, repository, source code store, etc.). In this exemplary embodiment, individual code generators 312 output a stream of text which may then be parsed, formatted, organized into files and stored in a repository. These latter operations/services being performed by generator framework tool 308.

Source code output 314 is the source code generated by operation and interaction of generator framework tool 308, generators dictionary 310 and generators 312 as a result of input of input data 306.

Data 316 is simply temporary storage area used during operation of computer system 100 (e.g., for temporary data files, data registers, etc.).

Figure 3B:
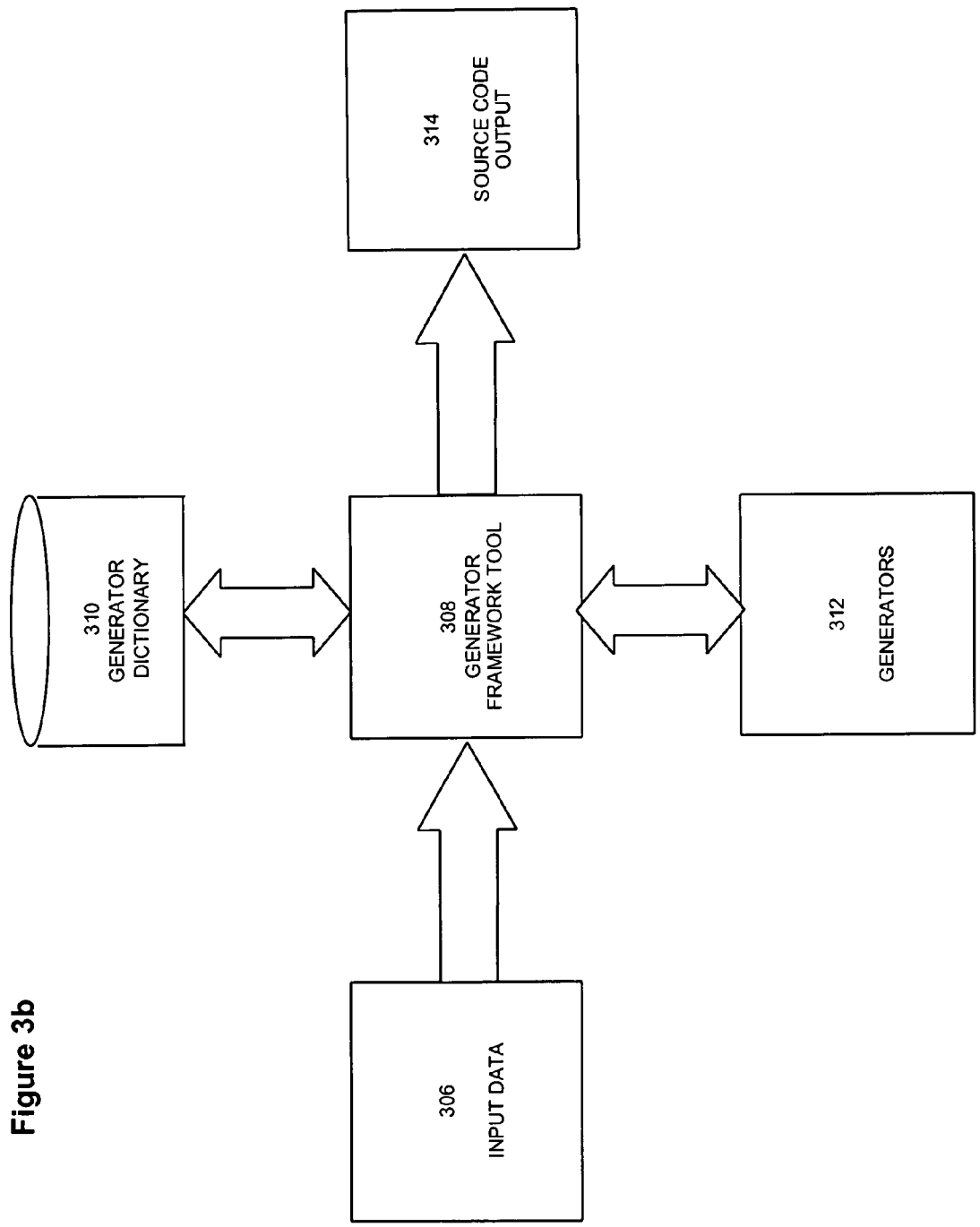
FIG. 3B illustrates the logical flows of data between some of the functional blocks of FIG. 3A.

As illustrated in FIG. 3B, input data 306 is provided to generator framework tool 308. Based on the contents of input data 306, generator framework tool 308 accesses and retrieves identity data identifying a code generator 312 to employ. The code generator 312 identified is then launched. As well, generator framework tool 308 passes all or some of input data 306 on which the identified code generator 312 is to operate. The source code 314 is then generated.

The operations of the exemplary computer system 100 is described in greater detail with reference to FIGS. 4-5.

Figure 4:
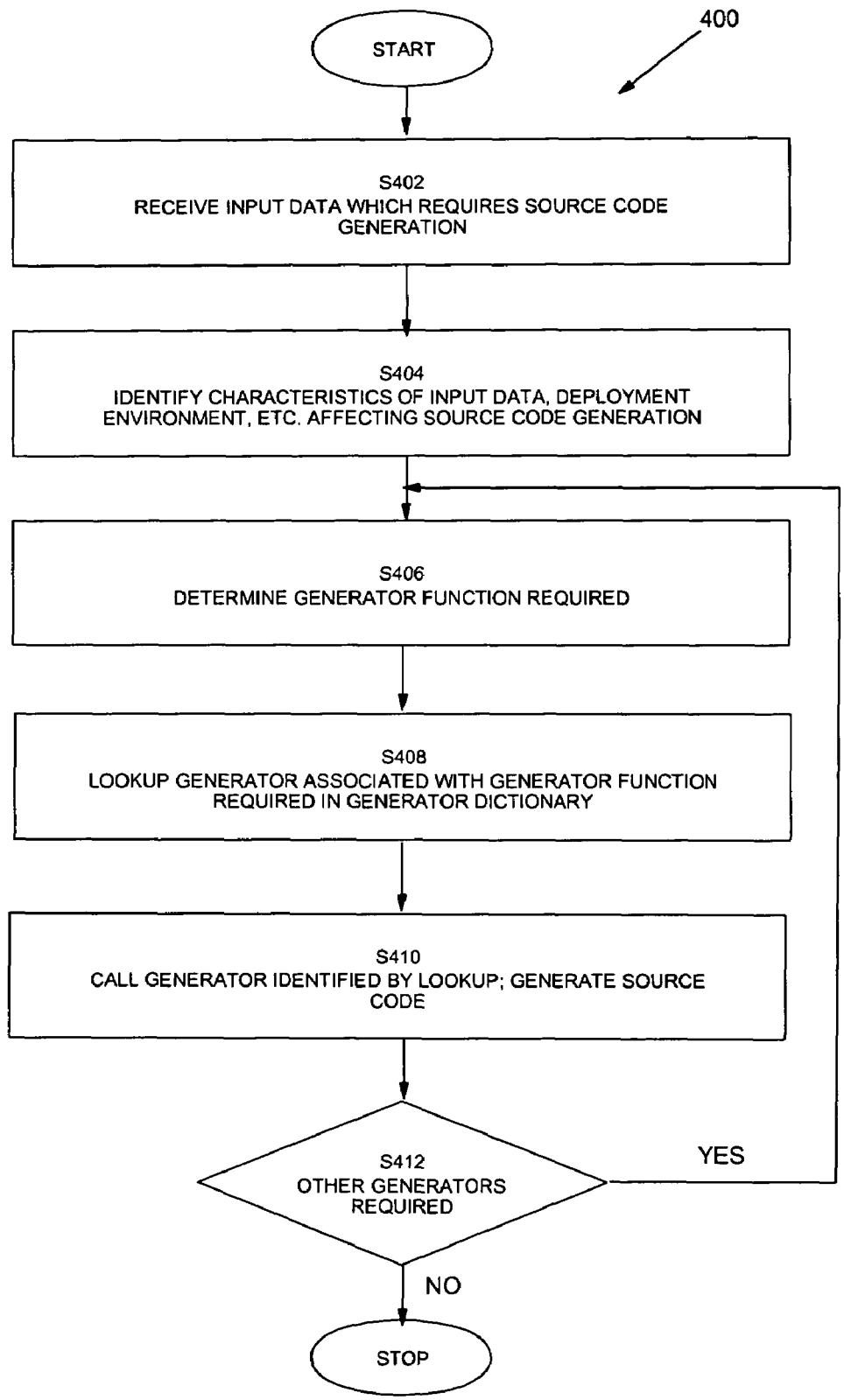
FIG. 4 is a flowchart of exemplary operations of the computer system of FIG. 1.

Operations 400, performed by computer system 100, are illustrated in flowchart form in FIG. 4. Initially, input data 306 is provided to and received by generator framework tool 308

(S402). S402 may be invoked by a user command or automatically by the tool/development environment used to create input data 306. The characteristics of the input data, the deployment environment, and other factors are identified by generator framework tool 308 (S404) which is used to determine the generator routine(s) which need to be performed to generate the source code required (S406). For example, if an EJB is provided as input data 306 to generator framework tool 308, the type of EJB (e.g., implementation, session, entity, etc.) is determined. Additionally, if it is determined that the EJB input is an entity type JavaBean then a further determination is made to determine if it is a bean managed or container managed persistence type bean. This type of characteristic data is used by generator framework tool 308 to determine the generator routine to be located in dictionary 310.

An example of an environmental factor is the database (e.g., IBM DB2, Oracle, Sybase, Microsoft SQL Server, etc.) used to store entity beans. Depending upon the database employed, different generators may be used to create source code for container managed persistence. Another environmental factor may be the need to support various releases of server software. Typically, there are few differences between releases. In such an instance, many of the same generators could likely be used. However, a small number of generators could be developed (and, therefore, inserted, if necessary, in generator dictionary 310) which are unique to each release of the server software.

Based on the routine(s) determined in S406, generator framework tool 308 accesses generator dictionary 310 and looks up (or queries) the dictionary for the generator identity data associated with the routine(s) which are to be performed (S408).

Continuing with the EJB example, if it is determined that the EJB input to generator framework tool 308 is a session type bean, then the implementation (e.g., the home implementation) associated with that bean type is to be created. This can be accomplished in the exemplary embodiment (and with reference to the exemplary excerpt in Table 1) by referencing the generator routine SessionHome (which is used to create an implementation) in dictionary 312. Accordingly, generator framework tool 308 will retrieve generator identity data associated with the SessionHome routine. This identity data identifies the generator 312 which is to be launched or executed to create the required source code 314—com.xxx-.generators.SessionHome. Accordingly, the identified generator 312 is launched and the source code 314 is generated (S410). The launched generator 312 may be passed the entirety of input data 306 or only that portion which is appropriate and required for the proper operation of generator 312.

As described above, many generators 312 may be employed for the creation of source code associated with input data 306. Accordingly, if generator framework tool 308 determines that other generators 312 are required (S412), steps S406-S412 are repeated as necessary. Alternatively, the determination of whether additional generators are required for the source code desired may be determined by the executing generator 312. In such an embodiment, step S412 would be performed by a generator 312. As will be appreciated, both approaches (i.e., the determination made in S412 by either generator framework tool 308 or a generator 312) could be combined during the creation of source code 314 resulting from the passing a single instance of input data 306 to generator framework tool 308.

To better understand steps S406-S412 of operations 400 and continuing with the EJB example, a session bean requires two implementations: a home implementation and a remote implementation; to be created. Moreover, the various subcomponents for each implementation also need to be created. Accordingly, once a session implementation has been created, the actual bean class object needs to be created by determining the routine and then calling and launching generator 312 associated with routine determined (i.e., determining the SessionBeanClass results in the identification of the generator com.xxx.generators.SessionBeanClass). The class object then requires additional source code to be generated for the fields, methods, method bodies and actual deployment. This is accomplished by further calls to generators based on repeating operations S406-S412 as required. The remote interface implementation is commenced by calling the generator associated with the generator routine Remote-Home-com.xxx.generators.RemoteHome.

Through operations 400 (FIG. 4), the required source code 314 is generated for the data input to generator framework tool 308. As will be appreciated by those of skill in the art, one or more generators 312 may have been launched to generate the source code necessary.

Figure 5:
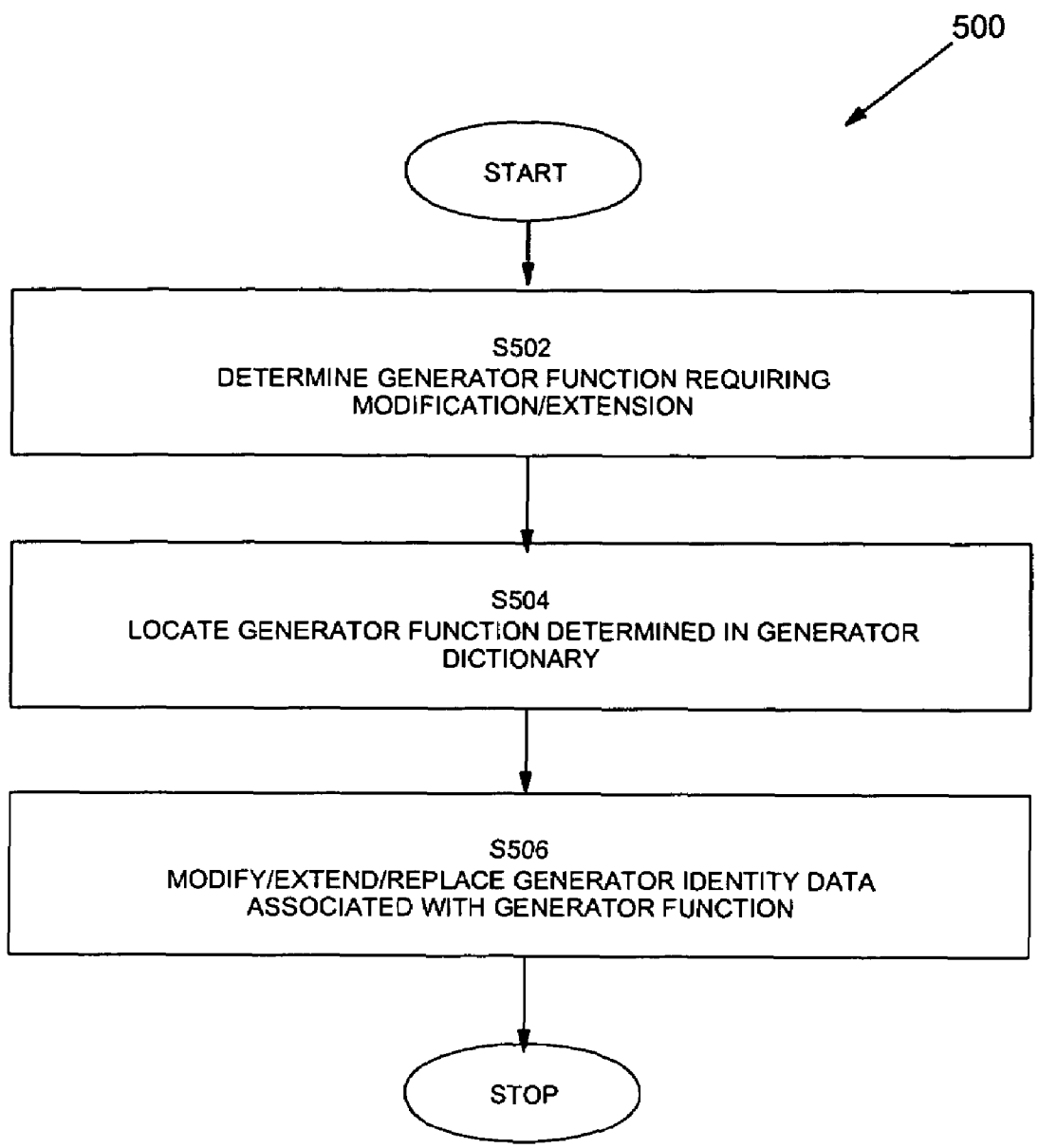
FIG. 5 is a further flowchart of exemplary operations of the computer system of FIG. 1.

FIG. 5 illustrates operations 500 which are used to modify dictionary 314. In the exemplary embodiment operations 500 are performed using a text editor. However, alternative applications could also be employed depending upon the format of dictionary 314. Operations 500 may be performed when an alternative generator 312 is to be used for a specific generation routine or when new generation routines are to be provided to a developer.

Initially, the generator routine which is associated with the unsatisfactory generator 312 is determined (S502). So, for example, if the com.xxx.generators.SessionBeanClass generator 312 is performing unsatisfactorily, then the associated routine identity—SessionBeanClass—would be determined. Once the generator routine identity has been determined, the generator identity data is identified in dictionary 312 (S504) and replaced with identity data of a modified and/or extended generator to perform the same routine (S506).

If an additional generator routine (and its associated generator 312) is to be added, a blank entry would be located in S502, the name of the routine entered and identity data identifying the generator 312 which is associated with performance of the routine would also be added.

Figure 6:
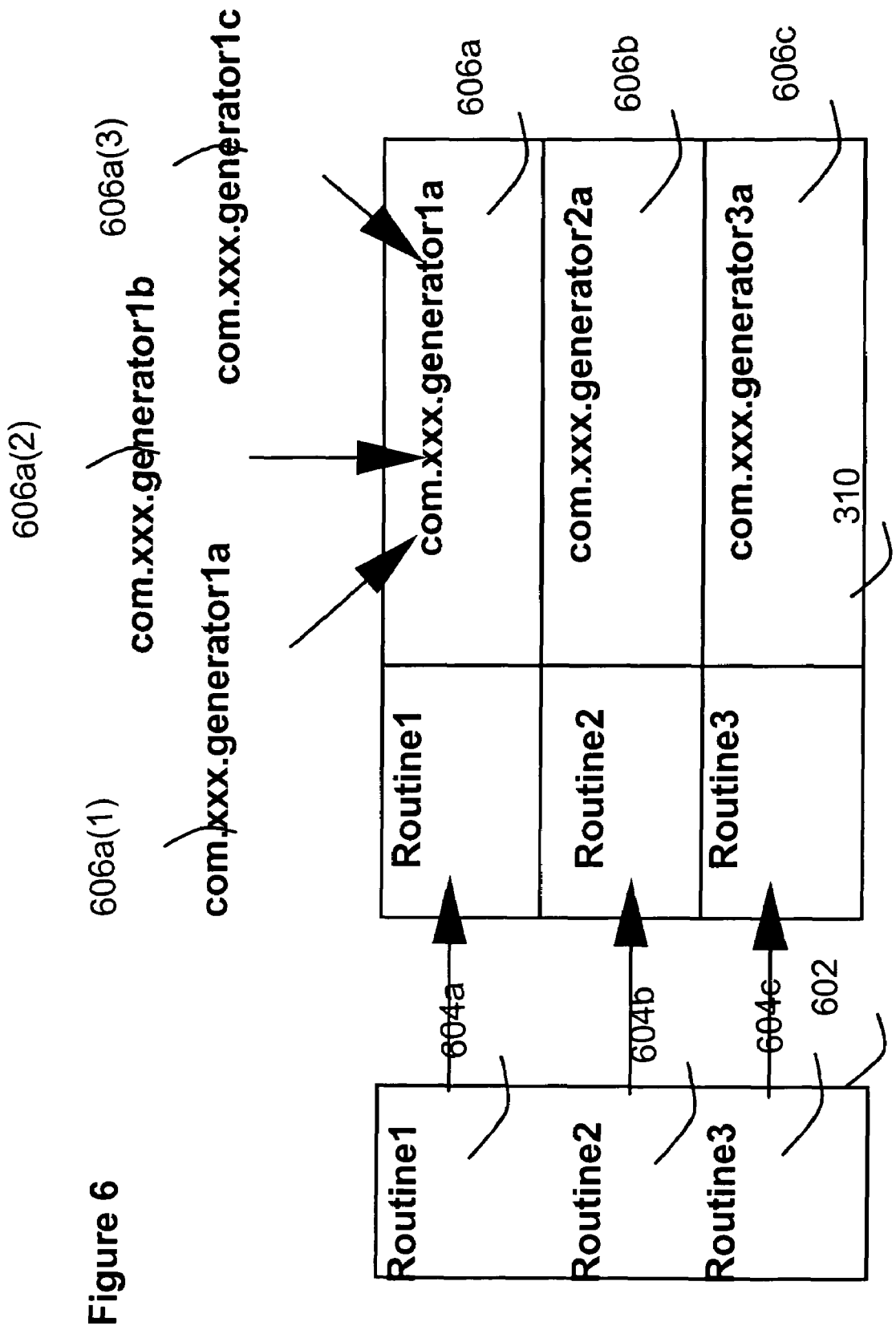
FIG. 6 is a schematic illustration of the operations illustrated in the flowchart of FIG. 5.

FIG. 6 illustrates an exemplary generator dictionary 310 which is used by entity 602. Entity 602 is, in the exemplary embodiment described above, generator framework tool 308. However, and as also described above, a code generator 312 (such as a logical code generator) may also access generator dictionary directly (or indirectly through cooperation with generator framework tool 308) to invoke other code generators to generate required source code.

In FIG. 6 entity 602 operates to invoke three generator routines—Routine1 (identified as element 604a), Routine2 (identified as element 604b) and Routine3 (identified as element 604c). When a call to Routine1 604a is made, generator dictionary 310 is accessed and based on the generator routine identity ("Routine1 "), the generator identity data 606a is retrieved (com.xxx.generator1a) and the identified generator 312 is invoked. Similarly, a call for Routine2 will result in com.xxx.generator2a (element 604b)—a code generator 312—being invoked. Finally, a call for Routine3 will result in com.xxx.generator3a (element 604c)—a code generator 312—being invoked.

As described above, generator dictionary 310 can be modified to modify a generator routine—code generator identity data pair. As illustrated, three code generators 312 could be associated with Routine1. The three possible code generators 312 which could be employed are: com.xxx.generator1a (element 606a(1)); com.xxx.generator1b (element 606a(2)); and com.xxx.generator1c (element 606a(3)). Each of the possible code generators which could be employed may, for example be particularly suited to different deployment environments.

Persons of ordinary skill in the art will appreciate the flexibility that is provided for code generation based on the code generation framework described herein.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

The invention claimed is:

1. A computer system for generating source code, said computer system comprising:
   a user amendable generator dictionary having a plurality of entries for associating a generator routine with a generator identity, said generator identity identifying a code generator and said generator dictionary comprising at least one logical generator and at least one physical code generator, wherein each of the at least one physical code generator is independent from each other of the at least one physical code generator, wherein all of the physical code generators generate physical code corresponding to one of a plurality of performed operations of an application adapted for an identical target environment, wherein a plurality of physical code generators is necessary to process a common application, wherein each physical code generator independently processes a separate portion of the application and wherein said generator dictionary is adapted to be amended by the user to remove at least one code generator and to replace the at least one code generator with a replacement code generator; and
   a code generation framework tool wherein said code generation framework tool, responsive to a request for an invocation of said generator routine, invokes said code generator identified by said generator identity associated with said generator routine;
   wherein the at least one logical generator calls the at least one physical code generator to generate source code.

2. The computer system of claim 1 wherein said generator dictionary comprises a plurality of generator routines, each of said generator routines associated with a generator identity.

3. The computer system of claim 1 wherein said generator dictionary comprises a text file.

4. The computer system of claim 1 wherein said generator routine comprises a logical generator name.

5. The computer system of claim 1 wherein said code generation framework tool retrieves from said generator dictionary said generator identity responsive to said request.

6. A generator dictionary stored on a recordable medium comprising:
   a plurality of generator routines that include at least one logical generator and at least one physical code generator that is independent from each other of the at least one physical code generator, each of said generator routines associated with code generator identity data, wherein all of the plurality of generator routines generate source code corresponding to one of a plurality of performed operations in an application adapted for an identical target environment, wherein a plurality of physical code generators is necessary to process a common application, and wherein each physical code generator independently processes a separate portion of the application, and
   wherein the at least one logical generator calls the at least one physical code generator to generate source code, and
   wherein the generator dictionary is designed to be amended by a user by removing at least one of the plurality of generator routines and replacing the at least one of the plurality of generator routines with a replacement generator routine.

7. A code generation framework tool comprising:
   a receiver for receiving input data;
   a user amendable generator dictionary accessor for retrieving data from a generator dictionary comprising at least one logical generator and at least one physical code generator that is independent from each other of the at least one physical code generator; and
   an invoking mechanism for calling a code generator;
   wherein, responsive to a receipt of input data at said receiver, said invoking mechanism calls a code generator identified by identity data retrieved by said generator dictionary accessor from a generator dictionary, the identified code generator corresponding to one of a plurality of performed operations of the input data, wherein a plurality of physical code generators is necessary to process a common application, and wherein each physical code generator independently processes a separate portion of the application, and
   wherein the generator dictionary is adapted to be amended by the user to remove the code generator and replace the code generator with a replacement code generator.

8. The code generation framework tool of claim 7 further comprising:
   a data dictionary associating a generator routine with identity data identifying a code generator.

9. The code generation framework tool of claim 8 wherein said generator dictionary accessor identifies a generator routine within said input data received and wherein said code generator identified is determined by retrieving said identity data associated with said generator routine identified.

10. A computer readable medium storing instructions and data, said instructions and data for adapting a computer system to:
    responsive to a request for invoking a generator routine, identify, in a user amendable generator dictionary that includes at least one logical generator and at least one physical code generator that is independent from each other of the at least one physical code generator, a code generator associated with said generator routine, wherein the identified code generator corresponds to one of a plurality of performed operations of the input data, wherein a plurality of physical code generators is necessary to process a common application, wherein each physical code generator independently processes a separate portion of the application;
    pass said input data to said code generator identified, said code generator being operable to:
       call another code generator to generate the source code; and
       generate the source code.

11. The computer readable medium of claim 10 wherein said instructions and data adapting said computer system to identify said code generator comprises adapting said computer system to:
    retrieve from a generator dictionary code generator identity data associated with said generator routine.

12. The computer readable medium of claim 11 wherein said instructions and data adapting said computer system to identify said code generator comprises adapting said computer system to:

prior to said retrieving, locate said generator routine in said generator dictionary.

13. The computer readable medium of claim 10 wherein said generator dictionary comprises a lookup table.

14. The computer readable medium of claim 10 wherein said generator dictionary comprises a text file.

* * * * *